United States Patent [19]
Weh et al.

[11] Patent Number: 5,575,510
[45] Date of Patent: Nov. 19, 1996

[54] QUICK-CONNECT FITTING FOR GAS CYLINDERS

[75] Inventors: Wolfgang Weh; Erwin Weh, both of Illertissen, Germany

[73] Assignee: Weh FmbH, Verbindungstechnik, Illertissen, Germany

[21] Appl. No.: 313,143

[22] PCT Filed: Mar. 31, 1993

[86] PCT No.: PCT/EP93/00703
§ 371 Date: Sep. 30, 1994
§ 102(e) Date: Sep. 30, 1994

[87] PCT Pub. No.: WO93/20378
PCT Pub. Date: Oct. 14, 1993

[30] Foreign Application Priority Data

Mar. 31, 1992 [DE] Germany .............................. 9204384 U

[51] Int. Cl.$^6$ ...................................................... F16L 35/00
[52] U.S. Cl. .............................. 285/35; 285/321; 285/316; 285/322
[58] Field of Search ...................................... 285/322, 323, 285/311, 312, 338, 104, 35

[56] References Cited

U.S. PATENT DOCUMENTS

| | | |
|---|---|---|
| 2,536,428 | 1/1951 | Dimitri et al. . |
| 2,675,829 | 4/1954 | Livers et al. . |
| 3,425,717 | 2/1969 | Bruce ................................... 285/312 X |
| 3,474,827 | 10/1969 | Rosell et al. . |
| 3,779,587 | 12/1973 | Racine ..................................... 285/312 |
| 4,540,201 | 9/1985 | Richardson .......................... 285/104 X |
| 5,060,982 | 10/1991 | Matsushita .......................... 285/312 X |

FOREIGN PATENT DOCUMENTS

| | | |
|---|---|---|
| 0039977 | 11/1981 | European Pat. Off. . |
| 0202592 | 11/1986 | European Pat. Off. . |
| 957929 | 2/1957 | Germany . |
| 813378 | 5/1959 | United Kingdom . |

OTHER PUBLICATIONS

International Search Report, Form PCT/ISA/210, dated Jun. 29, 1993.

*Primary Examiner*—Dave W. Arola
*Attorney, Agent, or Firm*—Knobbe, Martens, Olson & Bear

[57] ABSTRACT

A quick-connect fitting for transferring gaseous and/or liquid media, in particular for filling gas cylinders, has a housing (11) with an inlet (12), and outlet (13) for the medium to be transferred and a quick-connect device arranged in the area of the outlet (13) with clamping tongs (15, 15') that can be interlocked with an external complementary gripping profile, a hollow sealing piston (16, 16') that can glide in the housing (11) and an actuating device (17) for applying the clamping tongs (15, 15') which is linked to the sealing piston (16, 16') in a relatively movable manner by means of a sliding sleeve (18, 18'). At least one bolt (20) is provided for linking the sliding sleeve (18, 18') to the sealing piston (16, 16') and the actuating device has an elongated member (17) mounted on the housing (11) with a disk cam (36) that engages the sliding sleeve (18, 18') to make it move.

11 Claims, 8 Drawing Sheets

QUICK-CONNECT FITTING FOR GAS CYLINDERS

This invention relates to a quick-connect fitting for transferring gaseous and/or liquid media, in particular for filling gas cylinders.

The object of this kind of quick-connect fitting is to provide a simple, secure and reliable coupling which can be quickly attached for transferring gaseous and/or liquid media from its source into another area. An important aspect is the ease and reliability with which the quick-connect fitting can be operated even when used with unfavorable (for example, aggressive media) within a wide temperature range and/or with high media pressure.

This kind of quick-connect fitting is already disclosed in the European Patent Specification 0 340 879 A1. This quick-connect fitting comprises a housing with a media inlet and a media outlet; both the inlet and outlet areas contain valves. After the quick-connect device has been applied, these valves and clamping tongs inside the housing are activated in a certain sequence: first, by applying the quick-connect device to a nipple, the outlet valve is opened, then, by moving the control lever further, the clamping tongs are closed and finally the inlet valve is opened. The control lever is directly linked to a sliding sleeve which acts upon the clamping tongs and is linked to a central control valve trunk piston which—together with a seat that is attached to the housing—forms the inlet valve and permits the media entry when the seat is lifted.

The object of this invention is to provide the kind of quick-connect device described above which—with a minimum of parts—will offer a secure and reliable, leak-proof, easy to operate connection.

According to the invention, a quick-connect fitting for transferring gaseous and/or liquid media, in particular for filling gas cylinders, is advantageously provided. The fitting has a housing with an inlet, an outlet for the medium to be transferred and a quick-connect device arranged in the area of the outlet; the device has clamping tongs that can be interlocked with an external complementary gripping profile, a hollow sealing piston that can glide in the housing, and an actuating device for applying the tongs which is linked to the sealing piston by means of a sliding sleeve.

Additional preferred forms of the invention will be described in the claims below.

What distinguishes this new quick-connect invention is the extremely small amount of parts, the low production expenses and the extraordinary simplicity of operating it while at the same time satisfying the highest security requirements.

The preferred gripping profile connected to the clamping tongs for the coupling can consist of an internal thread, an external thread, beads, grooves and other design features which permit an interlocking profile grip. The tong profile can be shaped complementary to an external gripping profile such as a nipple or a threaded connection of a gas bottle valve.

According to the invention, the constructive concept of the quick-connect fitting is simplified especially because the sliding sleeve is directly connected to the sealing piston. This is very advantageous because when operating the quick-connect fitting it is sufficient to move just the sliding sleeve itself relative to the housing without having also to activate the actuating device linked to the sealing piston.

Preferably, the sliding sleeve is connected to the sealing piston in a relatively movable manner in order to enable the sealing piston to have the kind of relative movement which will produce the most optimal sealing conditions. According to the preferred form of the invention, a bolt is provided for linking the sliding sleeve to the sealing piston, which has the dual advantage of being extremely simple to mount and of constituting a very simple and effective constructive solution.

According to a preferred further development of the invention, in order to make possible the connection between the sliding sleeve and the sealing piston in a relatively movable manner, it is advantageously provided that each bolt mounted on the sealing piston will fit into a groove aligned with the guide motion of the piston; preferably, each bolt will enter the housing by passing through a slotted hole aligned with the guide motion of the sliding sleeve. The sealing piston itself will preferably be prestressed in the direction of the outlet which will create optimal sealing conditions in the area of the connection through an additional contact pressure.

According to a preferred form of the invention the actuating device has an elongated member mounted on the housing which is constructed as a pivoting lever, preferably in the shape of a handle which can be swiveled across the outlet area. This results in the simplification of the operating process, for example, when connecting to a gas bottle valve, since the handle is operable from both sides. If the filling size is adequately calculated, this conception allows for a further security feature insofar as a handle tilted behind the outlet area, especially if it moves above the gas bottle valve, will always guarantee the coordination between the quick-connect fitting and the connection nipple. It is not necessary that the handle be closed; it can also—similar to a cropped pivoting lever—just embrace the outlet area (especially a gas bottle valve) after the swivelling.

According to a preferred embodiment of the invention, the swivel handle is located in the area of the longitudinal axis of the housing; from an open position that is approximately vertical to the longitudinal axis of the housing, the handle can be swiveled into a closed position beyond a plane in which lie the longitudinal axis of the housing and the swivel axis.

The transformation of the swivel motion of the elongated member into a sliding motion of the sliding sleeve is especially advantageous and possible under balanced power transmission conditions if the elongated member, especially the swivel handle, is located on both sides of the longitudinal axis of the housing and if it has an eccentrically located disk cam that engages the sliding sleeve to make it move. The sliding sleeve can be engaged at a tip-stretched or a molded section of the sliding sleeve. Preferably, the disk cam will engage a recess of the sliding sleeve and thereby will become an especially compact design feature for controlling the transmisson of motion.

Preferably, the disk cam will have an eccentric swivel axis and an external profile with at least one notch area for attaching to the sliding sleeve prestressed in the direction of the outlet. This is an advantageous way to secure the opening position and, if need be, the closing position of the elongated member in a constructively very simple manner.

For connections to a nipple (for example, to the fitting of a gas bottle valve), with an external profile, the prestressed clamping tongs attached to the housing can expand in a radial direction and, by means of an internal control surface profile of the sliding sleeve, they can be interlocked tightly and securely from the outside with the external profile of the nipple.

For connections to a nipple (or to the fitting of a gas bottle valve) with an internal profile, the preferred embodiment of the invention of the quick-connect fitting provides that the clamping tongs attached to the housing be prestressed and expandable in a radial direction and that—by means of an external control surface profile arranged next to a sealing piston extension—they interlock tightly and securely with the internal profile. In addition to that, the sliding sleeve is provided with a prestressed sealing sleeve, which can be telescoped in the direction of the outlet.

Further details, features and advantages are to be found in the following description, in which two preferred embodiments of the invention are explained in greater detail with reference to the enclosed drawings, in which.

Figure 1:
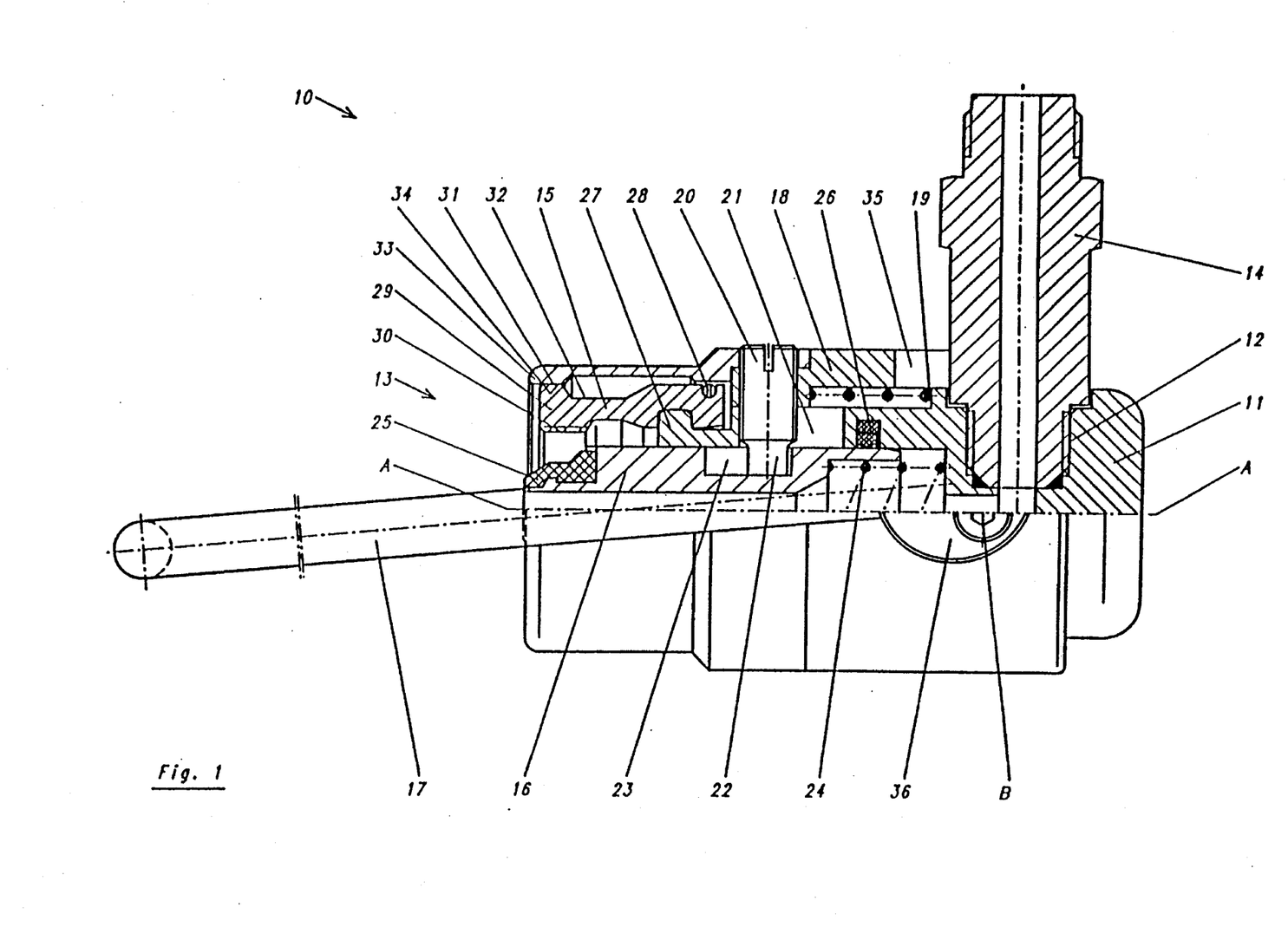
FIG. 1 shows a lateral view of a first embodiment of a quick-connect fitting for a nipple with an external gripping profile; the top half is cut and the quick-connect fitting is in its connection position.

In FIG. 1, a first embodiment of the invention of a quick-connect fitting 10 is shown in the connecting position; a connection nipple or a gas bottle valve has been omitted in this drawing. The quick-connect fitting 10 consists of a housing 11 with an inlet 12 and an outlet 13 for a medium, for example, gas, to be transferred through the inside of the housing 11. The inlet 12 has an internal thread in which is a tightly screwed connection adapter 14, which in turn is connected to a pipe or hose (not illustrated) that supplies the medium, i.e. the gas, from a gas source. The adapter 14 is screwed into the housing 11 horizontally to its longitudal axis, whereby the side entry depicted in FIG. 1 can also occur towards the bottom instead of towards the top or at the opposite housing 11 side of the outlet 13. The same applies to the second embodiment described later. In the area of the outlet 13, a quick-connect device is provided, which consists of clamping tongs 15, a hollow sealing piston 16 that can glide in the housing 11 and an actuating device 17 in the shape of a pivoting lever. A sliding sleeve 18 is guided on the cylindrical outside of the housing 11, and it is prestressed with a weak spring 19 in the direction of the outlet 13.

A screw bolt 20 is screwed into the sliding sleeve 18; the screw bolt 20 enters the housing by passing through a slotted hole 21 which is aligned parallel to the longitudinal axis A—A of the housing 11. The screw bolt 20 whose end section 22 has a reduced diameter, projects into a groove 23 which is molded into the sealing piston 16 by being aligned parallel to the longitudinal axis A—A of the housing 11. The sealing piston 16 is prestressed with a spring 24 in the direction of the outlet 13 and has at its front end a connection seal 25 for tight insertion of a nipple (not shown in FIG. 1). The hollow sealing piston 16 is sealed in the area of its opposite end against the housing 11 by means of radial seals 26 and housed in a cylindrical section of the housing 11 so that it can glide.

At least three clamping tongs 15 are divided radially in equal distance from each other within the cylindrical end section 27 of the housing 11; there they are arranged so they can move in a radial direction and are prestressed by means of a pressure spring 28 in the expansion direction. The front section 29 of each clamping tong 15 has a gripping profile 30 that is aligned towards the inside, in this case an internal thread, for engaging an external complementary gripping profile, which in this case is an external profile. The front section 29 has a control surface 31 on its outside adjacent to which is a molded section 32. The sliding sleeve 18 shows, at its front end 33, that is, in the area of the outlet 13, a raised, partially cylindrical, control surface 34, whose function, together with the control surface 31, is to keep the clamping tongs 15 in their connection position. After a backwards movement of the sliding sleeve 18, for which it has a suitable recess 35 in the area of the adapter, the safety mechanism of the connection position is removed by the control surface 34 and the clamping tongs 15 can, as shown in FIG. 3, expand under the effect of the pressure spring 28, whereby the molded section 32 comes into contact with the control surface 34.

Figure 2:
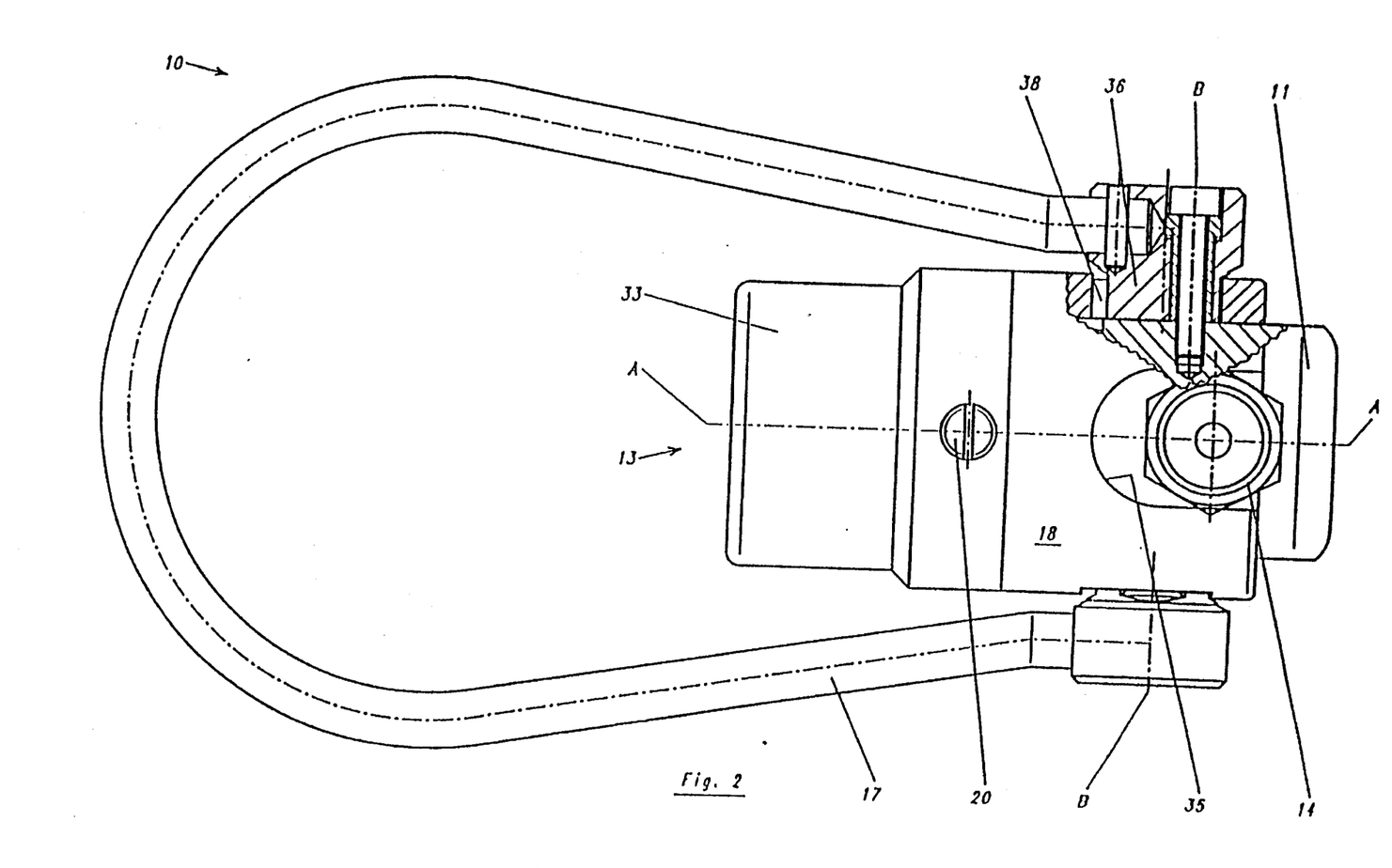
FIG. 2 is a top view of the quick-connect fitting of FIG. 1 with a broken away section in the area of the pivoting of the elongated member.

For moving the sliding sleeve 18, the actuating device possesses a pivoting lever 17 which is, as shown in FIG. 2, pivotally mounted at opposite sides of the housing at the height of the longitudinal axis A—A and flares away from the housing in the shape of the connecting half of an arc. The shape of the pivoting lever is such that it can be adapted quickly to the various applications of the quick-connect fitting. In the illustrated embodiment, the shape of the pivoting lever 17 serves to facilitate swivelling over a gas bottle valve, see FIG. 4.

Figure 3:
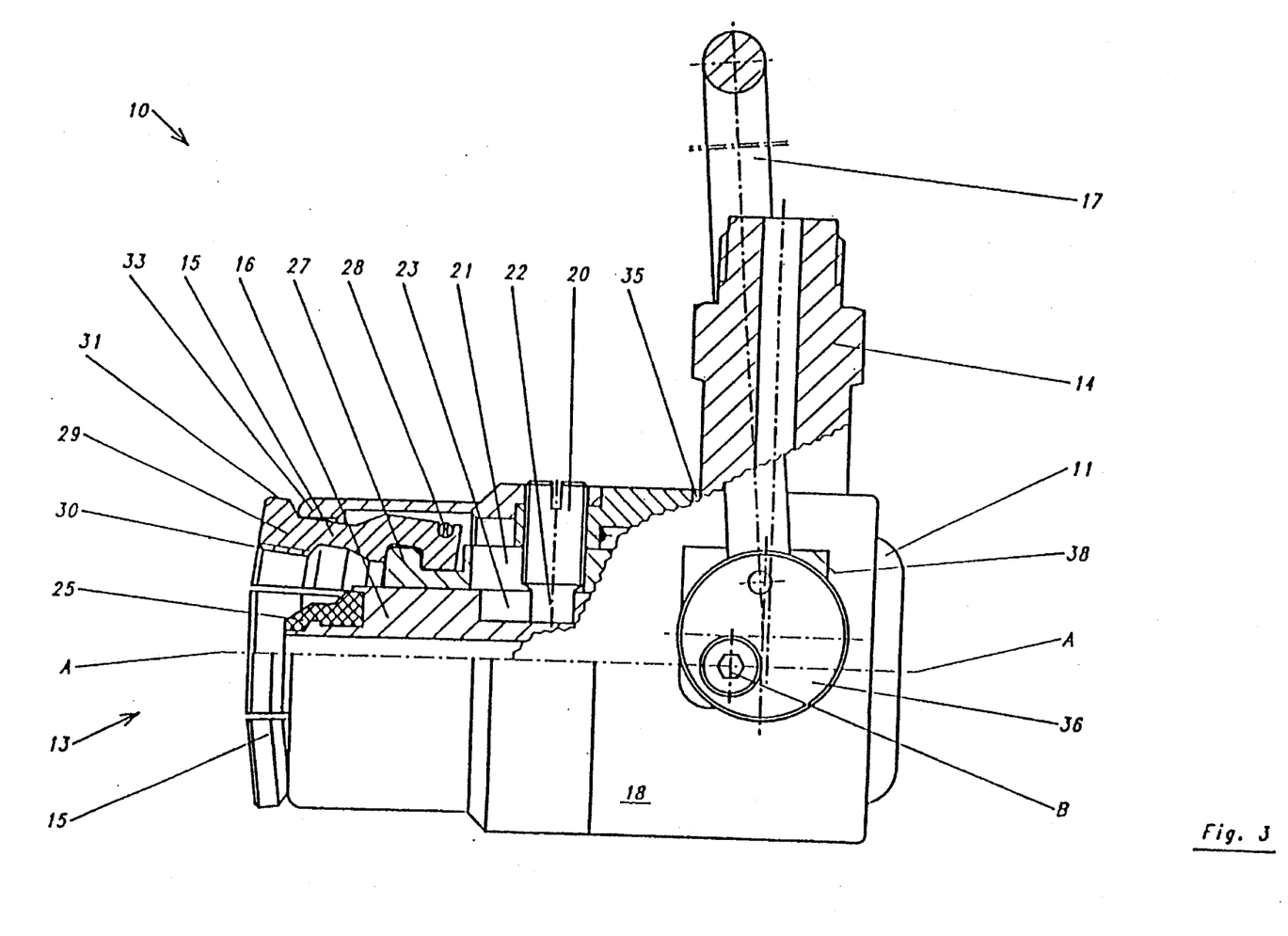
FIG. 3 is a lateral view similar to that of FIG. 1, except that the quick-connect fitting is in the opened position.

In FIG. 3, the pivoting lever is shown in an opened position in which it is aligned approximately vertical to the longitudinal axis A—A of the housing 11. From this opened position, the pivoting lever 17 can be swivelled across a plane into the connected position, illustrated in FIGS. 1, 2, and 4. The spanned plane is defined by the longitudinal axis A—A of the housing 11 and the swivel axis B—B of the pivoting lever, which intersects the former vertically. Based on this alignment of the pivoting lever in the connected position, the extreme end of the pivoting lever 17 lies below the above-defined plane and forms, together with this plane, an acute angle. This controlled valve position, in addition to the parallel plane alignment, adds a securing function to which also the dead weight of the pivoting lever 17 contributes.

In the pivotal area of the pivoting lever 17, a disk cam 36, arranged eccentrically to the swivel axix B—B, is connected on each side with the pivoting lever. The outer radius of the disk cam has a cam top 37 for securing the pivoting lever in the opened position. The disk cam 36 engages in a recess 38 which is cut into the sliding sleeve 18. The shape of the recess 38 is such that the disk cam can turn inside the recess 38 and that, primarily due to effect of the counter pressure of the spring 19, a secure engagement in the opened position and in the connected position is possible. Furthermore, the disk cam 36 has another cam top 39, with which the slightest backward movement of the sliding sleeve 18 is limited in such way that the control surface 34 of the sliding sleeve 18 will always keep the control surface 31 of the clamping tongs 15 securely in the connected position.

The mode of operation of the quick-connect fitting 10 will be described below with referencece to FIGS. 3 and 4. In FIG. 3, the quick-connect fitting 10 is shown in the opened position, ready to be coupled to a nipple with a complementary interlocking gripping profile. The pivoting lever 17 is swivelled upwards and, correspondingly, the sliding sleeve 18 is in its most retracted position due to the engagement of the eccentric disk cam 13 with the cam top 37 on one side wall of the disk cam recess 38. The clamping tongs 15 are radially expanded. The screw bolt 20 is in the most retracted position in the slotted hole 21 and the sealing piston 16 is under the effect of the spring 24 touching the front end section 22 of the screw bolt 20 with the back end of the groove 23 (in the Figures, "relating to the housing 11" means front outlet side 13).

Figure 4:
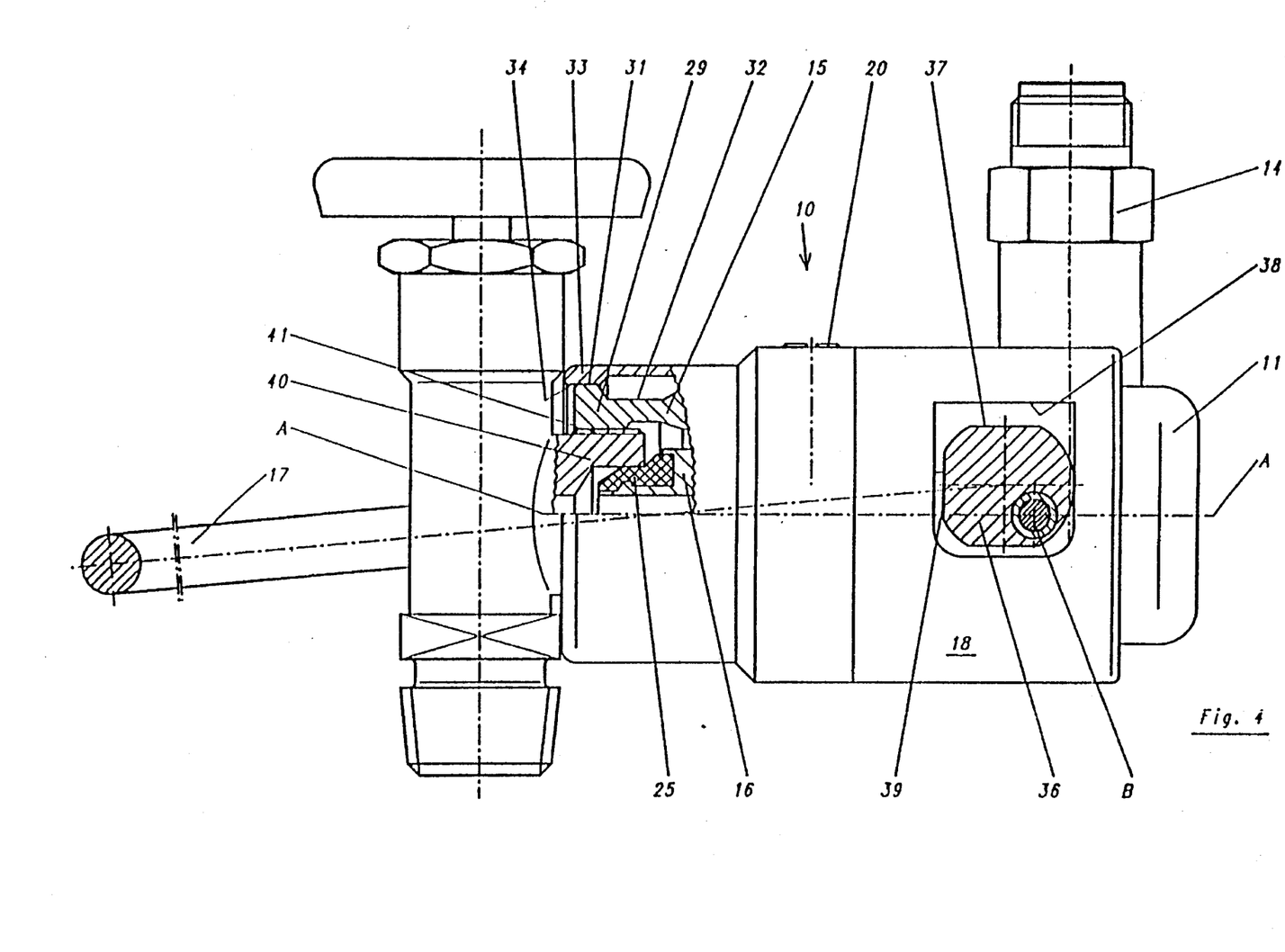
FIG. 4 is an illustration of a quick-connect fitting similar to that in FIG. 1; however, it is in a connection position with a gas bottle valve. In order to illustrate the connection position and the sealing conditions, the top half of the connection area is broken away and the pivoting area of the pivoting lever has been cut to explain the interlocking of disk cam and sliding sleeve recess.
Figure 5:
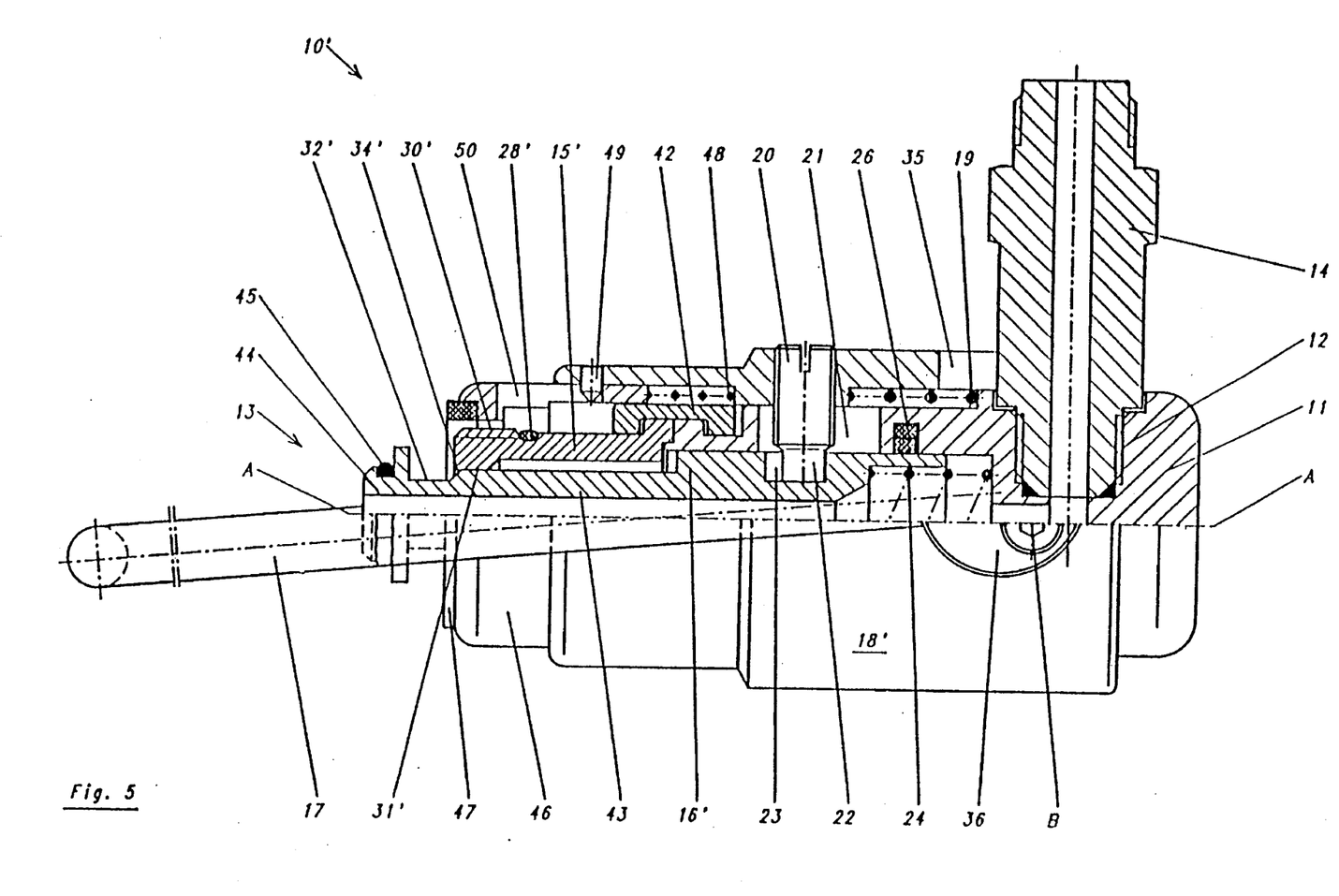
FIG. 5 is a lateral view similar to that in FIG. 1, however comprising a modified quick-connect fitting that is intended for the connection to a nipple, especially to a gas bottle valve with an internal thread or an internal gripping profile.
Figure 6:
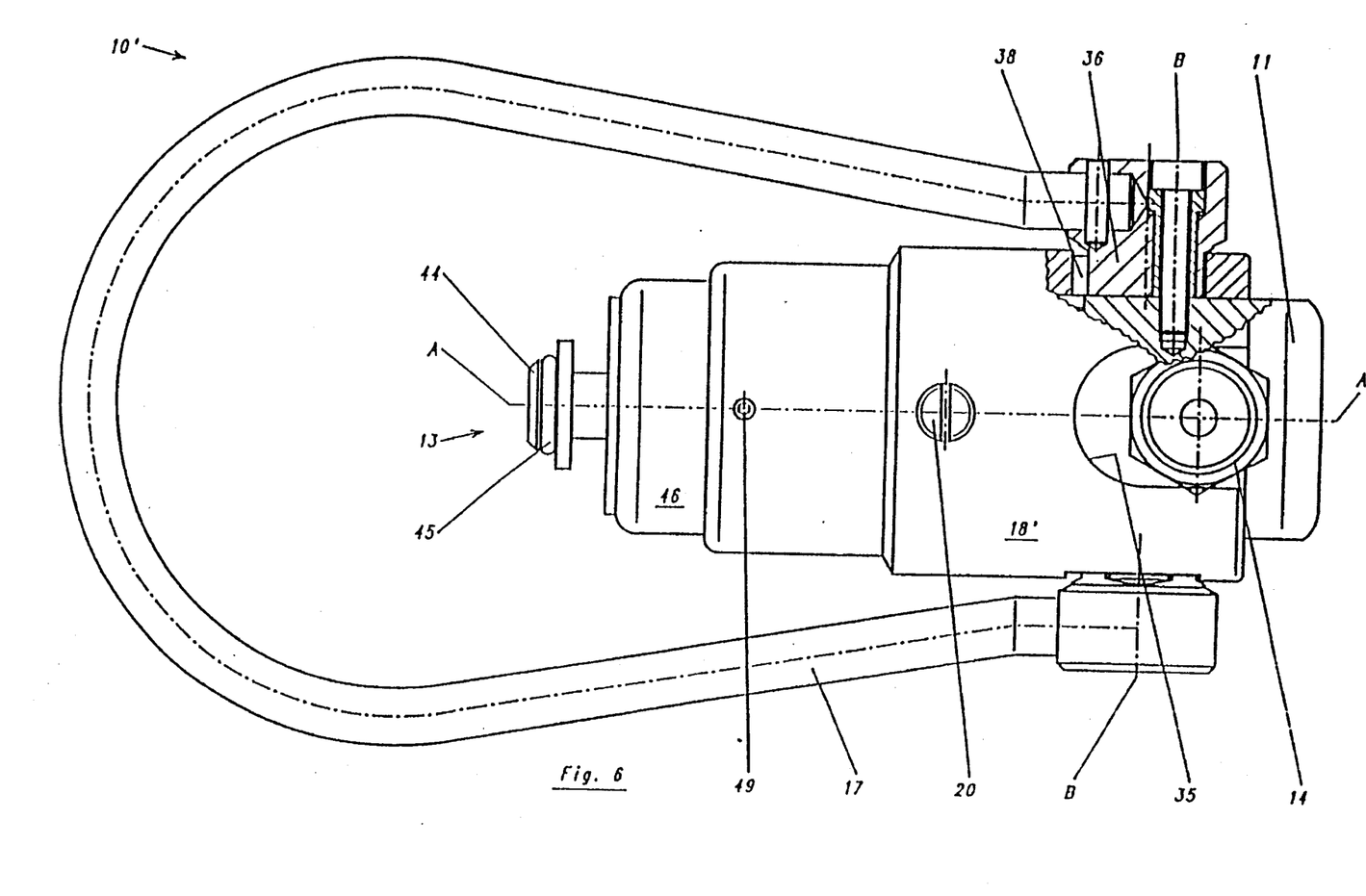
FIG. 6 is a top view of a quick-connect fitting according to FIG. 5.
Figure 7:
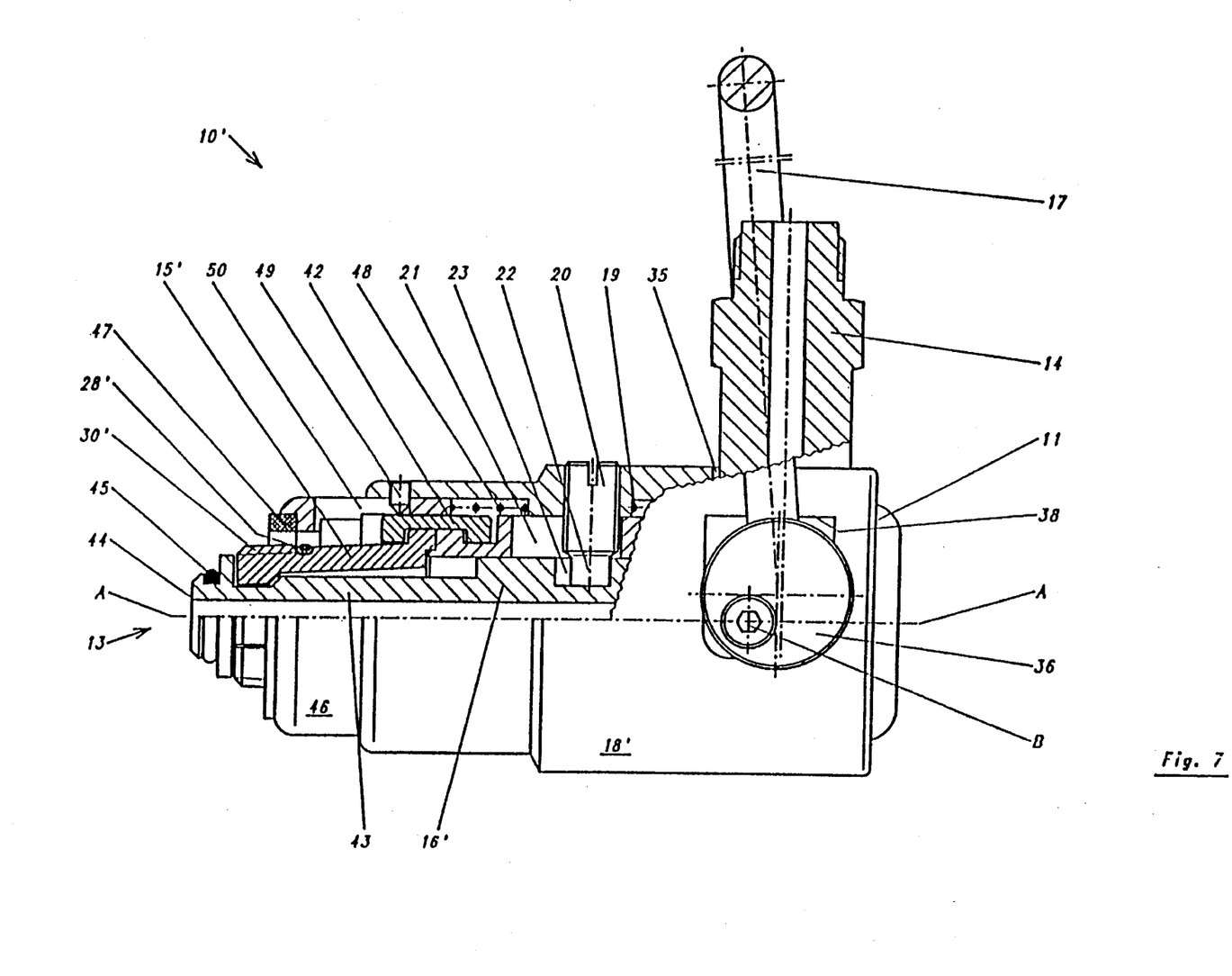
FIG. 7 is a lateral view according to FIG. 5, however in the opened position of the elongated member.

If the quick-connect fitting 10 in its opened position is attached to a nipple or according to FIG. 4 to a thread connection 40 with an external thread 41, the thread connection 40 pushes the sealing piston 16 into the housing 11 until the profile 30 of the clamping tongs 15 is above the thread 41 and can engage the thread for a secure contact. The sealing piston 16 can maximally be pushed into the housing 11 until the front end of the groove 23 is touching the end section 22 of the screw bolt 20. Another way for the user to find the right connection position is to glance through a gap between the expanded clamping tongs 15.

Then the user holds the quick-connect fitting 10 in the above-described connection position and swivels the lever 17 over the gas bottle valve into the position shown in FIG. 4. Through this swivelling motion of the lever 17, because of the controlling effect of the interlocking of the disk cam 16 into the recess 38 of the sliding sleeve 18, a forward push, that is a push in the direction of the outlet 13, is created. In this process, the sliding sleeves 16 front section 33 and its control section 34 act upon the clamping tongs 15 until the interlocking position shown in FIG. 4 is reached, where the internal thread 30 of the clamping tongs 15 engages the external thread 41 of the gas bottle valve connection 40 and is held securely in this connected position by the sliding sleeve 18. In this connected position, the lower section 22 of the screw bolt 20 lies at the front end of the groove 23 of the sealing piston 16 and assures securely tight pressure conditions through the sealing connection 15 with the gas bottle valve connection 40, as shown in FIG. 4.

A second example of a quick-connect fitting 10 is shown in FIGS. 5 through 8. For simplification, identical parts will be labeled with the same reference numbers and for slightly modified parts the reference number will show an '.

Figure 8:
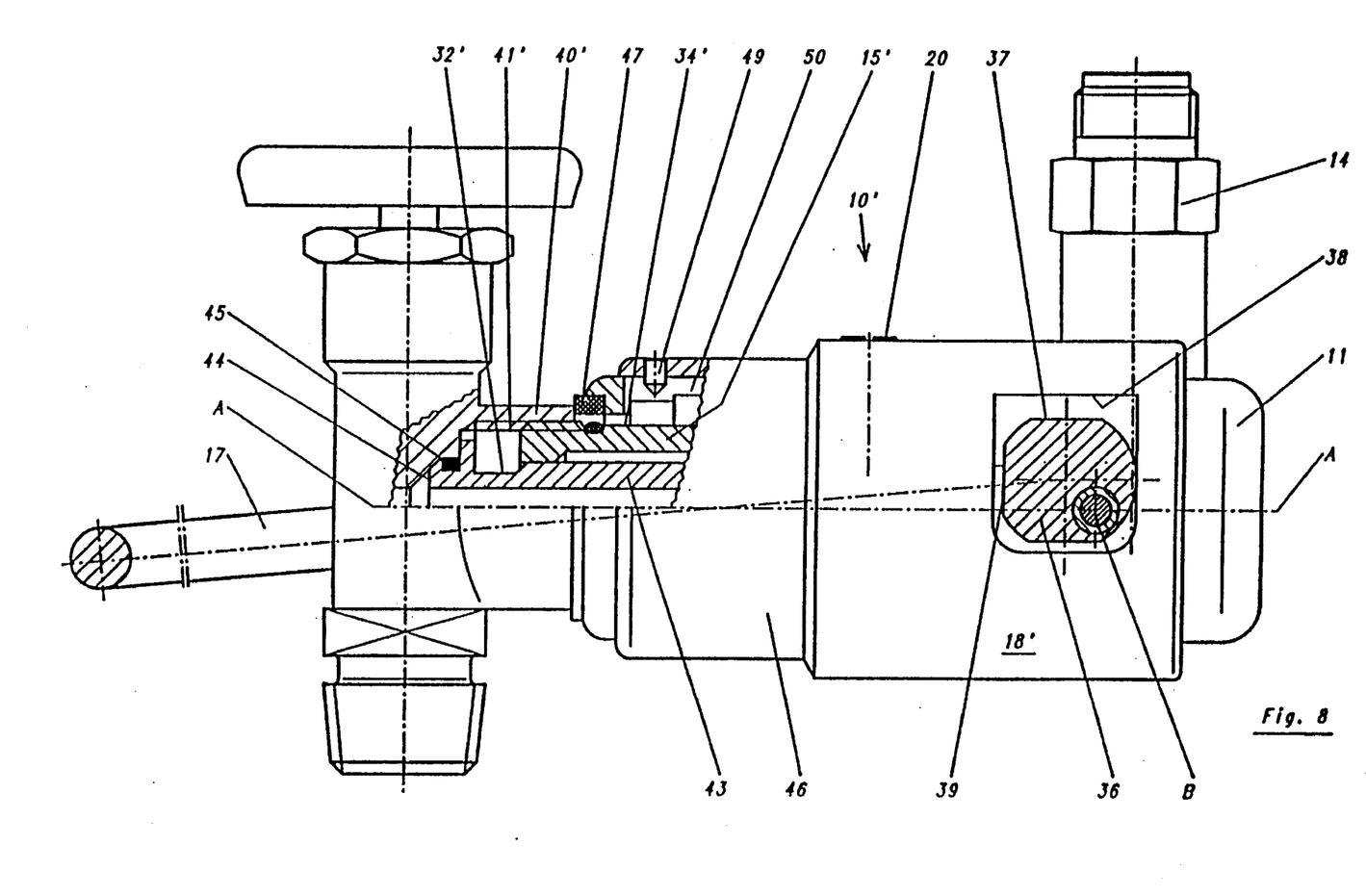
FIG. 8 is a lateral view to illustrate the quick-connect fitting, according to FIG. 5 in a connecting position to a gas bottle valve with internal thread.

The quick-connect fitting 10' is intended for the connection to a nipple with an internal profile, in this case, for a gas bottle valve connection 40' with an internal thread 41' (see FIG. 8). Deviations from the first examplified embodiment are provided in the area of the quick-connect device when the clamping tongs 15' in the front end of the housing 11 are prestressed in a radial direction by means of a pressure spring 28' and when the device has a gripping profile 30' pointing radially to the outside and opposing inner control surface 31'. The clamping tongs 15 are linked to the front end of the housing 11 in a movable manner by means of a clamp case 42.

The control surface 31' of the clamping tongs 15' is acted upon by the control surface 34' which is attached to an extension 43 of the sealing piston 16' and which has molded section 32' for the expanding entry of the control surfaces 31' in the opened position of the quick-connect fitting 10'. The front end of the extension 43 of the sealing piston 16 ends as a connection piece 44 having a radial seal 45. This connection piece, as can be seen in FIG. 8, is provided for the tight connection in the gas bottle valve connection 40'.

Contrary to the first examplified embodiment, the sliding sleeve 18, which is also connected to the sealing piston 16' by means of the screw bolt 20, does not have a control profile for the clamping tongs 15,' but rather a telescoping sealing sleeve 46 with an interfacing contact sealing 47. This sealing sleeve 46 is prestressed towards the front in the direction of the outlet by means of a spring 48 (see FIG. 5). As protection against torsion vis-a-vis the sliding sleeve 18', it is provided with an elongated slot 50 parallel to the longitudinal axis A—A into which engages a pin 49 that is mounted inside of the sliding sleeve 18'.

Operating the quick-connect fitting 10' is basically the same as operating the quick-connect fitting 10, whereby the quick-connect fitting 10' is inserted with expanded clamping tongs 15'into the gas valve connection 40' until the front sealing 47 connects tightly. When the lever 17 is swivelled, the connection piece 44 moves from the position shown in FIG. 7 into the gas bottle filling connection 40 until it rests tightly at a sealing seat whereby the control surface 34' causes the clamping tongs to engage with their external thread 30' into the internal thread 41' and to be held securely in place.

In both examples of embodiment, the quick-connect 10 and the 10', a slight swivel motion of approximatly 90° will cause a simple, reliable, quick and secure coupling for transferring gaseous and/or liquid media, in particular for filling gas cylinders.

We claim:

1. Quick-connect fitting for transferring gaseous and/or liquid media, in particular for filling gas bottles, comprising:

a housing having an inlet and an outlet for the medium to be transferred, a quick-connect device arranged in the area of the outlet comprising clamping tongs, which are adapted to be interlockable with an external complementary profile said profile including an internal surface, the outlet of the housing being generally cylindrical and the tongs being distributed circumferentially about the outlet with gaps in between, the tongs including external ends which, in combination, define a connection for the complementary profile, each tong being pivotable and biased so that its external end is urged radially outward.

a hollow sealing piston having a seal thereon and housed in said housing, and a device for axially glidably moving said piston with respect to said cylindrical outlet and said tongs to a position sealingly engaging said internal surface, a sleeve displaceable about said housing and having an inner control surface for engaging external control surfaces of said tongs, an eccentric-shaped disk cam rotatable about said housing and positioned to engage a portion of said sleeve so as to displace said sleeve toward and away from said outlet, and an actuating device for applying the clamping tongs so as to displace the external ends of said clamping tongs radially inward about said profile, said actuating device including an elongated member fixedly mounted with respect to said rotatable disk cam.

2. Quick-connect fitting according to claim 1, wherein said device includes at least one bolt for linking said sleeve to said sealing piston.

3. Quick-connect fitting according to claim 2, wherein said bolt extends into a groove in said sealing piston, which is aligned in said axial direction.

4. Quick-connect fitting according to claim 2, wherein said sleeve surrounds said housing, and wherein said bolt passes through said housing in a slotted hole which is aligned in the axial direction of the piston movement.

5. Quick-connect fitting according to claim 1, wherein said elongated member is formed as a pivoting lever.

6. Quick-connect fitting according to claim 1, wherein said elongated member has the shape of a lever which can be swivelled over the area of said outlet.

7. Quick-connect fitting according to claim 6, wherein said pivoting lever at said housing is supported in the area of the longitudinal axis of said housing and wherein said lever can be swivelled from an opened position, which is aligned approximately vertical with respect to the longitudinal axis of the housing into a connected position beyond a plane in which lie the longitudinal axis of said housing and the swivel axis lie.

8. Quick-connect fitting according to claim 1, wherein said disk cam engages said sleeve in a recess of said sleeve.

9. Quick-connect fitting according to claim 1, wherein said fitting includes a spring for biasing said sleeve toward said outlet and said disk cam has an eccentric swivel axis and an external profile with at least one cam top for contact with said sliding urging said sleeve against the bias of said spring in an axial direction of said outlet.

10. A quick-connect fitting for transferring gases and/or liquid media from a nipple of a container, comprising:

a rigid housing having an inlet and an outlet for transferring said medium, and a seal for sealing said outlet to said nipple said housing having a longitudinal axis and said outlet being located concentrically about said longitudinal axis;

a sleeve adapted to slide along said longitudinal axis and surrounding said housing, said sleeve having an end adjacent said outlet with a radially inwardly directed control surface;

a plurality of tongs disposed about said housing and within said sleeve, said tongs being distributed about the circumference of said outlet and each being pivotable so that an end of each of said tongs is radially displaceable at said outlet, said tongs having radially outward control surfaces shaped to mate with the inward control surface of said sleeve;

a biasing member urging the ends of said tongs outward into contact with the inward control surface of said sleeve;

an eccentric cam disk rotatable about an axis transverse to said longitudinal axis, said cam disk having a plurality of surfaces for engaging and displacing said sleeve along said longitudinal axis; and an actuating lever attached to said eccentric cam disk for displacing said sleeve along said longitudinal axis and, in turn, radially displacing the ends of said tongs for alternatively clamping and releasing said nipple inserted in said outlet.

11. A quick-connect fitting for transferring gases and/or liquid media from a nipple of a container, the nipple defining an inwardly directed mating surface, comprising:

a rigid housing having an inlet and an outlet for transferring said medium, said housing having a longitudinal axis and said outlet being located concentrically about said longitudinal axis;

a piston adapted to slide along said longitudinal axis and a seal for sealing said piston within said housing and a seal for sealing said piston to said nipple, said piston having an end adjacent said outlet with a radially outwardly directed control surface;

a sleeve adapted to slide along said longitudinal axis surrounding said housing, said sleeve being coupled to displace said piston and provided with a seal for engagement with said nipple;

a plurality of tongs disposed about said housing and around said piston end, said tongs being distributed about the circumference of said outlet and each being pivotable so that an end of each of said tongs is radially displaceable at said outlet, said tongs having radially inward control surfaces shaped to mate with the outward control surface of said piston;

a biasing member urging the ends of said tongs inward into contact with the outward control surface of said piston;

an eccentric cam disk rotatable about an axis transverse to said longitudinal axis, said cam disk having a plurality of surfaces for engaging and displacing said sleeve along said longitudinal axis; and an actuating lever attached to said eccentric cam disk for displacing said sleeve along said longitudinal axis and, in turn, axially displacing said piston to radially outwardly displace the ends of said tongs into engagement with the mating surface of said nipple.

* * * * *

UNITED STATES PATENT AND TRADEMARK OFFICE
CERTIFICATE OF CORRECTION

PATENT NO. : 5,575,510
DATED : November 19, 1996
INVENTOR(S) : Wolfgang Weh and Erwin Weh It is certified that error appears in the above-indentified patent and that said Letters Patent is hereby corrected as shown below:

On the Title page item number [73], line 1, change "FmbH" to --GmbH--.

item number [86], line 1, change "PCT/EP93/00703" to --PCT/EP93/00783--.

Signed and Sealed this

Tenth Day of June, 1997

Attest:

BRUCE LEHMAN

Attesting Officer

Commissioner of Patents and Trademarks